Aug. 11, 1936.  C. A. CAMPELL  2,050,783
AIR BRAKE
Filed Oct. 3, 1933
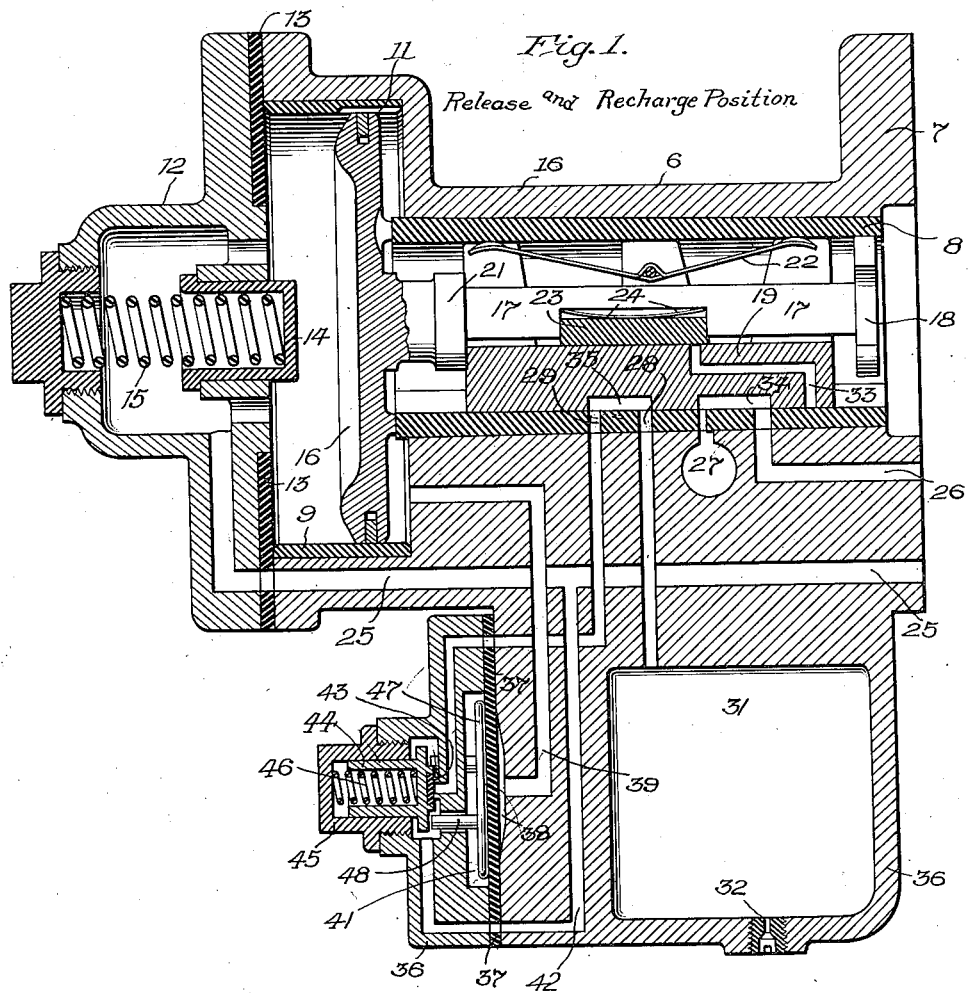
Fig. 1.
Release and Recharge Position
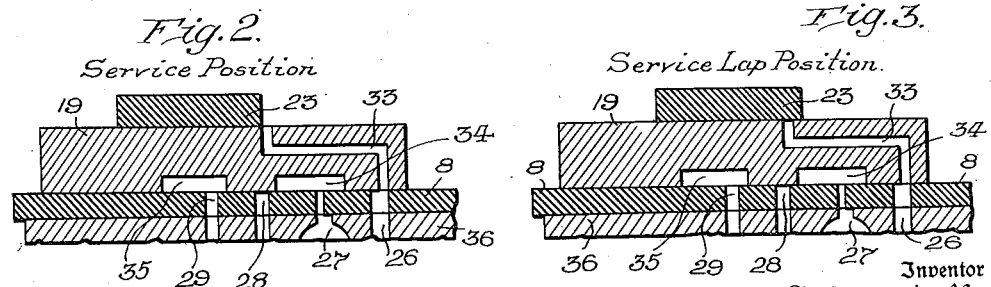
Fig. 2.
Service Position
Fig. 3.
Service Lap Position
Inventor
Charles A. Campbell
By
Attorneys Patented Aug. 11, 1936

2,050,783

UNITED STATES PATENT OFFICE 2,050,783

AIR BRAKE

Charles A. Campbell, Watertown, N. Y., assignor to The New York Air Brake Company, a corporation of New Jersey Application October 3, 1933, Serial No. 691,988

12 Claims. (Cl. 303—35)

This invention relates to air brakes and particularly to the quick service venting function.

The most important object of the invention is to provide quick service venting initiated by means independent of the triple valve (and hence not affected by the highly variable friction characteristics of most triple valves), said venting being terminated by the response of the triple valve to the brake pipe pressure reduction caused by such venting.

It has been proposed heretofore to initiate quick service flow by the motion of the triple piston and graduating valve relatively to the triple slide valve, and to terminate it by motion of the slide valve. The use of quick service vent valves operable wholly independently of the triple valve has also been proposed.

Marked advantages as to uniformity and certainty of venting are, however, attainable by using an independent valve to initiate quick service venting while the triple slide valve is in release position, such venting being terminated when the triple piston responds and shifts the triple slide valve to service position.

Further refinement of the venting function can be secured by causing the vent to discharge into a measuring chamber having a restricted bleed to atmosphere. As a result of this arrangement the first effect of the opening of the vent valve is a sudden drop of brake pipe pressure which should start the triple piston, but if the triple piston sticks, a slow sustained venting will cause its movement ultimately, without causing operation of such emergency venting apparatus as may be present.

A simple embodiment of the invention is illustrated in the accompanying drawing. In the drawing the ports are shown conventionally as if they lay all in a single plane, and possible emergency apparatus and functions are omitted in the interests of simplicity.

In said drawing,—

Fig. 1 is a vertical axial section of a triple valve with independent quick service valve related to the triple valve according to the invention. The parts are shown in release position.

Fig. 2 is a fragmentary view of the graduating valve, slide valve and seat, with the valves in service position.

Fig. 3 is a similar view with the valves in service lap position.

The body of the triple valve is indicated at 6. This is of familiar form having a flange 7 to be bolted to the auxiliary reservoir. The body encloses a slide valve chamber in direct communication with the auxiliary reservoir, the valve chamber having the usual bushing 8 formed with a seat for the slide valve. There is also the usual cylinder with bushing 9, having charging groove 11.

The front cap 12 closes the forward end of the cylinder and seats on the front cap gasket 13 of familiar form. A graduating stop 14 with graduating spring 15 is provided to assist the piston in shifting from service to service lap position.

The triple piston 16 has a stem 17 guided in bushing 8 by spider 18. The slide valve 19 is confined with lost motion between spider 18 and collar 21. The slide valve 19 is seated by bow spring 22.

The graduating valve 23 is closely confined in a notch in stem 17 so that it moves with piston 16. It is pressed against a seat on the back of slide valve 19 by leaf spring 24.

The brake pipe passage appears at 25 and communicates with the space at the outer face (left in the drawing) of piston 16. In the seat for slide valve 19 are the brake cylinder port 26, exhaust port 27, quick service chamber port 28, and quick service valve port 29. The port 28 leads to the quick service chamber 31 in body 6. An interchangeable choke fitting 32 provides means for constantly venting the chamber 31 through a restricted port of chosen size.

Slide valve 19 has service port 33 controlled by graduating valve 23 in a familiar manner. In the lower face of valve 19 is exhaust cavity 34 which connects brake cylinder port 26 and exhaust port 27 in release position only. Also in the lower face of valve 19 is the quick service control cavity 35 which connects quick service valve port 29 with quick service chamber port 28 in release position only.

Bolted to the lower portion of body 6 is a cap 36, the meeting faces of the body and cap being formed to clamp a flexible diaphragm 37 between them. The diaphragm separates two opposed chambers. Chamber 38 in body 6 is connected by passage 39 with the space to the right of piston 16 and consequently with the auxiliary reservoir. Chamber 41 in cap 36 is connected by passage 42 with brake pipe port 25.

A valve seat 43 and co-acting poppet valve 44 control flow from passage 42 (and hence from the brake pipe) to port 29. The valve 44 is guided in screw plug 45 and urged in a seating direction by coil compression of spring 46. A thrust disc 47 in chamber 41 engages the face of diaphragm 37 and carries thrust pins 48 which engage and unseat valve 44 when brake pipe pressure is reduced sufficiently below auxiliary reservoir pressure to cause diaphragm 37 to overpower spring 46. A satisfactory differential is three-quarters of a pound per square inch, and is fixed for a diaphragm of given size by selecting a spring 46 of proper strength.

The operation of the device above described is as follows:—

With the parts in release position (Fig. 1) a service reduction of brake pipe pressure causes diaphragm 37 to move to the left and open valve 44. This occurs before piston 16 moves, for diaphragm 37 responds to a brake pipe pressure reduction substantially less than that necessary to move piston 16.

The opening of valve 44 permits brake pipe air to flow by way of passage 42, port 29, cavity 35 and port 28 to chamber 31. The resulting drop in brake pipe pressure should cause the triple valve to move to service position (Fig. 2), but if it does not, the sustained venting through choke 32 will have that effect.

The shift to service interrupts the connection between ports 28 and 29 and thus terminates quick service venting flow.

When falling auxiliary reservoir pressure approaches equalization with brake pipe pressure, spring 15 will shift piston 16 and graduating valve 23 to service lap position (Fig. 3). Neither this, nor motion of graduating valve 23 back to service position, will restore venting flow.

Consequently quick service venting is terminated by motion of the triple valve from release to service position and cannot be resumed until the triple valve moves back to release position.

The above description is intended to be illustrative and not limiting as various modifications are possible and are contemplated.

What is claimed is,—

1. The combination of a triple valve adapted for connection with brake pipe, brake cylinder and auxiliary reservoir and including a triple piston, a quick-service brake-pipe vent port and valve means actuated by said piston and controlling said port to open and close the same respectively in release and service positions of the triple valve; and a pressure-actuated valve independent of said triple valve, also controlling said vent port and arranged to open in response to a service reduction of brake pipe pressure insufficient to cause motion of the triple valve.

2. The combination defined in claim 1, in which the vent port leads to a measuring chamber having a restricted bleed port leading to atmosphere.

3. The combination defined in claim 1, in which the pressure actuated valve comprises a diaphragm subject on its opposite sides to brake pipe and auxiliary reservoir pressures, and a yielding loaded poppet valve operatively related thereto and closing in the direction of venting flow.

4. The combination defined in claim 1, in which the valve means actuated by the triple piston and controlling the quick service port, comprises a port in the valve element of the triple valve.

5. The combination defined in claim 1, in which the quick service vent port leads to a measuring chamber having a restricted atmospheric vent, the chamber being large enough to assure at least initial motion of the triple piston upon its connection with the brake pipe.

6. The combination defined in claim 1, in which said pressure actuated valve responds to the differentials between brake pipe and auxiliary reservoir pressures.

7. The combination defined in claim 1, in which said pressure actuated valve responds to differentials between brake pipe pressure and auxiliary reservoir pressure and in which the vent port leads to a measuring chamber having a restricted bleed port leading to atmosphere.

8. The combination of an automatic brake valve adapted for connection with brake pipe, brake cylinder and auxiliary reservoir, and including a movable abutment and a valve member operable thereby and controlling admission and exhaust of pressure fluid to and from the brake cylinder, said abutment responding to pressure differentials between brake pipe and auxiliary reservoir and serving to move its associated valve member from release position to application position upon reduction of brake pipe pressure; a second and more sensitive abutment also subject to pressure differentials between the brake pipe and auxiliary reservoir; a normally closed valve actuated by said second abutment and moved thereby in an opening direction when brake pipe pressure is reduced below auxiliary reservoir pressure, the last named valve controlling a vent port from the brake pipe; and means for closing said vent port operated by motion of said automatic brake valve from release toward application position.

9. The combination defined in claim 8, in which said means for closing said vent port comprises a port controlled by the valve member of said automatic brake valve.

10. The combination defined in claim 8, in which the second abutment is a flexible diaphragm.

11. The combination defined in claim 8, in which said vent port leads to a measuring chamber having a restricted bleed port leading to atmosphere.

12. The combination of a triple valve including a quick service brake pipe vent port controlled by the triple valve itself, said port being open in release position of the triple valve and closed by motion of the triple valve from release toward application position; a normally closed vent valve also controlling said vent port in series with the triple valve; and means for opening said vent valve operable by a reduction of brake pipe pressure insufficient to initiate motion of said triple valve from release position.

CHARLES A. CAMPBELL.